United States Patent [19]

Kikuchi

[11] 4,431,717

[45] Feb. 14, 1984

[54] BATTERY CASE

[75] Inventor: Hideju Kikuchi, Tokyo, Japan

[73] Assignee: Sony Corporation, Tokyo, Japan

[21] Appl. No.: 342,234

[22] Filed: Jan. 25, 1982

[30] Foreign Application Priority Data

Jan. 31, 1981 [JP]  Japan .................................. 56-13185
Aug. 31, 1981 [JP]  Japan ................................ 56-136494

[51] Int. Cl.³ ...................... H01M 6/30; H01M 2/04; H01M 10/48; H01M 12/00
[52] U.S. Cl. ..................................... 429/100; 429/9; 429/90; 429/176; 339/152
[58] Field of Search ..................... 429/96, 97, 99, 100, 429/48, 90, 9, 176; 339/152, 154 A

[56] References Cited

U.S. PATENT DOCUMENTS

| | | | |
|---|---|---|---|
| 2,718,541 | 9/1955 | Spooner | 429/97 |
| 2,879,316 | 3/1959 | Enikeieff | 429/99 |
| 3,301,712 | 1/1967 | Bach | 429/100 |
| 3,748,185 | 7/1973 | Cooper et al. | 429/100 |
| 3,990,919 | 11/1976 | Krueger | 429/100 |
| 3,998,516 | 12/1976 | Mabuchi | 429/100 |
| 4,020,245 | 4/1977 | Mabuchi et al. | 429/100 |
| 4,037,026 | 7/1977 | Mabuchi | 429/100 |
| 4,352,052 | 9/1982 | Opper | 429/100 |

*Primary Examiner*—Brian E. Hearn
*Assistant Examiner*—Stephen J. Kalafut
*Attorney, Agent, or Firm*—Lewis H. Eslinger; Alvin Sinderbrand

[57] ABSTRACT

A battery case for selectively housing batteries of different sizes has a housing dimensioned to receive the largest of the batteries and provided with an opening through which the batteries are insertable into the housing, and a battery holder is movable in the housing in the direction toward and away from the opening to effectively vary the space available in the housing for accommodating a battery between the holder and a lid which is engageable in the opening for closing the housing. Locking arms are pivotally mounted at the opposite sides of the housing and are selectively engageable with the holder for determining the positions of the latter relative to the housing, and battery size detectors are integral with the locking arms and project into the housing for engagement by a battery inserted therein so as to position the locking arms, and hence the holder, in dependence on the size of the inserted battery.

14 Claims, 7 Drawing Figures

BATTERY CASE

BACKGROUND OF THE INVENTION

1. Field of the Invention

This invention relates generally to a battery case for selectively housing batteries of different sizes, for example, dry cell batteries of different diameters, and more particularly is directed to such a battery case which can be conveniently incorporated in portable electronic apparatus for housing the batteries thereof.

2. Description of the Prior Art

It has been proposed to provide battery cases which can house batteries of different sizes or diameters, for example, batteries conventionally identified by the designations R20, R14, R6, R03 and R1. However, in the previously proposed battery cases for housing batteries of different sizes, a plurality of individual compartments are provided in a housing for receiving batteries of respective different diameters. Accordingly, such a battery case usually has unused compartments and requires a large space with the result that electronic apparatus incorporating the battery case becomes undesirably bulky. Furthermore, since there are different compartments for receiving the batteries of correspondingly different sizes, the user must exercise care in installing batteries to be sure that the selected batteries are situated in the corresponding compartments. Thus, the installation of new batteries is inconvenient.

OBJECTS AND SUMMARY OF THE INVENTION

Accordingly, it is an object of the present invention to provide a battery case for selectively housing batteries of different sizes, and which eliminates the above-mentioned disadvantages of the conventional battery cases provided for that purpose.

More specifically, it is an object of the present invention to provide a battery case for selectively housing batteries of different sizes, and in which the space required for the battery case is reduced to a minimum so that the battery case can be incorporated in electronic apparatus of reduced or relatively small size.

It is another object of the invention to provide a battery case, as aforesaid, which is capable of selectively housing as many as three or more different sizes of batteries in a completely stable manner, that is, in a manner to ensure that the housed battery, whatever its size, will not shift or change its position within the battery casing even when the electronic apparatus incorporating the battery casing is subject to relatively rough usage or handling.

It is a further object of the invention to provide a battery case, as aforesaid, in which the space provided within the housing is automatically changed or accommodated to suit the size of a battery being inserted therein without any further intervention or manipulation by the user.

In accordance with an aspect of this invention, a battery case for selectively housing batteries of different sizes comprises a housing dimensioned to receive the largest of the batteries and having an opening through which the batteries are insertable into the housing, a battery holder disposed in the housing for movement in the direction toward and away from the opening between at least first and second positions to effectively vary the space available in the housing for accommodating a battery therein between the holder and a lid which is engageable in the opening for closing the housing, locking means selectively engageable with the holder for limiting the movement of, or selectively locking the holder, in at least said first and second positions thereof relative to the housing, and battery size detecting means projecting into the housing and engageable by a battery inserted therein through the opening for determining which of the locking means engages the holder and thereby ensuring that the resulting position of the holder corresponds to the size of the inserted battery.

In a desirable embodiment of the invention, the locking means include locking arms mounted on the housing for movement by the detecting means between at least first positions, in which the locking arms engage the holder to position the latter in the first position of the holder, and second positions of the locking arms, in which the latter released the holder to permit the holder to be moved by insertion of the largest battery to the second position of the holder against stop means provided on the housing.

Further, in a desirable embodiment of the invention, the detecting means are integral with the locking arms and are movable by spring means into the housing from opposite sides thereof to first positions corresponding to the first positions of the locking arms, and in which the smallest of the batteries is disposable between the detecting means without displacing the latter from the first positions thereof, while the largest battery, when disposed in the housing, displaces the detecting means to second positions of the latter which correspond to the second position of the locking arms. Further, in the foregoing desirable embodiment of the invention, a battery of intermediate size between that of the largest and smallest batteries, when disposed in the housing, displaces the detecting means to intermediate positions located between the first and second positions of the detecting means and corresponding to respective intermediate positions of the locking arms, and the locking arms, when in their intermediate positions, lock the holder in an intermediate position between its first and second positions, whereby to snugly accommodate the intermediate size battery between the holder and lid.

The above, and other objects, features and advantages of the invention, will be apparent in the following detailed description of illustrative embodiments of the invention which is to be read in connection with the accompanying drawings wherein the same reference numerals are used to identify the same parts in the several views.

DETAILED DESCRIPTION OF THE PREFERRED EMBODIMENTS

Figure 1:
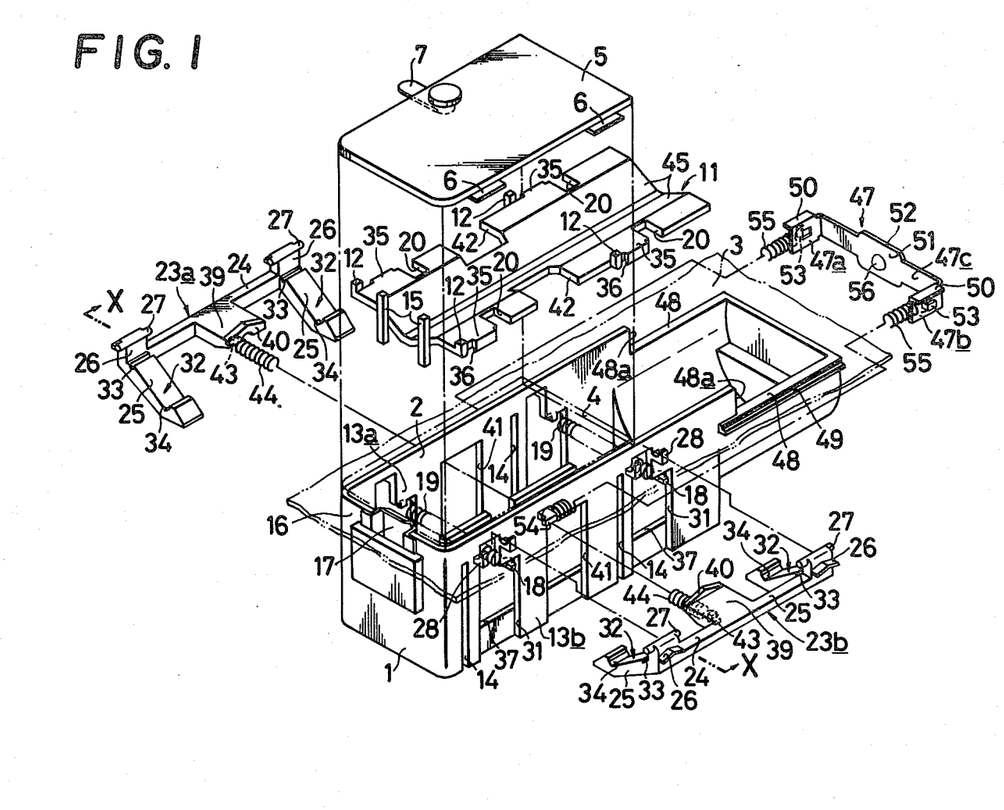
FIG. 1 is an exploded perspective view showing the several components or parts of a battery case according to one embodiment of the present invention.

Referring to the drawings in detail, and initially to FIG. 1 thereof, it will be seen that a battery case according to the embodiment of the present invention there illustrated comprises a substantially elongated housing 1 which is molded from a synthetic resin, such as, an ABS resin, and is desirably integral with the chassis of an associated electronic apparatus. As shown, housing 1 is substantially of rectangular-parallelepiped configuration, and has an opening 2 extending therealong so as to be at the top of housing 1 when the latter is in the position illustrated in FIG. 1. Housing 1 is disposed immediately under a cabinet wall 3 (indicated in dot-dash lines on FIG. 1) of the electronic apparatus, and such cabinet wall 3 has a battery insertion hole 4 formed therein to register with at least a part of opening 2 of housing 1. A removable lid 5 is provided for closing battery insertion hole 4 and is formed with a pair of projections 6 spaced apart along one side edge of lid 5 to be received in receptacles or grooves (not shown) formed in cabinet wall 3 at the respective side of hole 4. A pivoted latch 7 is carried by lid 5 at the side of the latter remote from projections 6 and is engageable in a keeper (not shown) provided in cabinet wall 3 at a respective location adjacent hole 4 for locking lid 5 in its closed position across hole 4. A resilient pressure pad 8 (FIGS. 2-4), for example, of a synthetic sponge-like material, is adhered to the underside of inner surface of lid 5 so as to bear against a battery positioned within housing 1, as hereinafter described in detail, when lid 5 is in its closed position.

A battery holder 11 is disposed in housing 1 for movement in the direction toward and away from opening 2 so as to effectively vary the space available for accommodating a battery in housing 1 between holder 11 and lid 5. In order to guide holder 11 during such movement thereof relative to housing 1, pairs of projections 12 extend from the opposite sides of holder 11 at locations spaced apart along the latter, and are slidably received in corresponding pairs of slits 14 extending vertically in opposite side walls 13a and 13b of housing 1. Holder 11 is further guided in its movement by a pair of laterally spaced rods 15 extending vertically at one end of holder 11, and being slidably engageable against an adjacent end wall 16 of housing 1. A positive terminal plate 17 is mounted on end wall 16 and extends inwardly from the latter between guide rods 15. Paired spring anchors 18 are formed integrally with the upper portions of side walls 13a and 13b of housing 1 at two locations spaced substantially apart along housing 1, and two coil springs 19 extend laterally across housing 1 below battery holder 11 and have their opposite ends secured to the respective paired anchors 18 on side walls 13a and 13b, respectively. The coil springs 19 are thus maintained under tension for yieldably urging holder 11 upwardly within housing 1. Battery holder 11 has pairs of notches or cutouts 20 formed in its opposite side edge portions at spaced apart locations corresponding to the positions of coil springs 19 so that such coil springs can extend through the respective notches or cutouts 20 to avoid interference with the downward movement of holder 11, below the level of anchors 18, for example, to the positions shown on FIGS. 3 and 4.

The battery case according to the embodiment of the invention shown in FIG. 1 further includes pivotal members 23a and 23b molded of a synthetic resin and being associated with side walls 13a and 13b, respectively, of housing 1. Each of pivotal members 23a and 23b is shown to include an elongated connecting element 24 having a pair of parallel arms 25 extending from its opposite ends at which there are also provided upwardly directed hangers 26 at obtuse angles relative to the adjacent arms 25. Pivot pins 27 are provided at the upper ends of hangers 26 and are engageable in pivot pin supports or seats 28 formed on the outer surfaces of side walls 13a and 13b.

Openings 31 are formed in side walls 13a and 13b of battery housing 1 below pivot pin supports or seats 28 so that, when pivot pins 27 of members 23a and 23b are engaged in seats 28, the respective arms 25 can extend into battery housing 1 through the openings 31 in side walls 13a and 13b, respectively.

In the battery case embodying this invention, arms 25 of pivotal members 23a and 23b are included in locking means 32 which are selectively engageable with holder 11 for locking the latter in respective positions relative to housing 1. In order to perform the foregoing function, each of arms 25 is formed with a locking recess 33 adjacent the end of arm 25 integral with connecting element 24 and also with a locking recess 34 adjacent the free end of arm 25. Lateral extensions 35 are provided at the opposite sides of holder 11 at spaced apart locations corresponding to the positions of the arms 25, and are formed with depending locking ridges 36 which are selectively engageable in locking recesses 33 or 34 of the adjacent arms 25 in dependence on the angular positions of the respective arms 25.

When arms 25 extend approximately horizontally into housing 1 through openings 31 in the opposite side walls 13a and 13b, locking ridges 36 on holder 11 engage in locking recesses 33 of arms 25 (FIG. 2), and holder 11 is thereby locked in a first or uppermost position at a relatively small distance from lid 5 in its closed position. On the other hand, when arms 25 are directed downwardly outside of housing 1 (FIG. 4) holder 11 can be displaced downwardly in housing 1 to a second or lowermost position in which lateral extensions 35 seat against stop means defined by the upper edges 37 of partitions 38 extending across the lower portions of openings 31. Further, in the embodiment of the invention illustrated in FIG. 1, holder 11 is adapted to be locked in an intermediate position (FIG. 3) between the first or uppermost position of FIG. 2 and the second or lowermost position of FIG. 4. Holder 11 is locked in such intermediate position when arms 25 extend downwardly and slightly inwardly through openings 31 in adjacent side walls 13a and 13b for engaging locking ridges 36 of holder 11 in locking recesses 34 of arms 25 (FIG. 3).

The battery case according to this invention is further provided with battery size detecting means adapted to project into housing 1 and engageable by a battery inserted therein through opening 2 for controlling the locking means 32 and thereby determining the locked position of holder 11 in correspondence to the size of the inserted battery. In the embodiment of this invention illustrated in FIG. 1, the battery size detecting means is constituted by a detecting arm 39 extending laterally from the middle portion of connecting element 24 of each of the pivotal members 23a and 23b. Each detecting arm 39 extends substantially at right angles to the plane of the upwardly directed hangers 26 so as to be at a relatively small or acute angle relative to the plane of the respective locking arms 25. Each detecting arm 39 terminates in a battery contacting end portion 40 and is adapted to extend inwardly through an opening 41 formed in the adjacent housing side wall 13a or 13b. Holder 11 has cutouts 42 formed in its opposite side portions and each positioned approximately midway between lateral extensions 35 on the respective side edges of holder 11 so that each detecting arm 39 and its contacting end portion 40 can move through the notch or cutout 42 at the adjacent side of holder 11 for contacting a battery situated on the holder. Spring anchors 43 are formed at the undersides of detecting arms 39 of pivotal members 23a and 23b and a coil spring 44 extends laterally between such anchors 43 under battery holder 11 so as to urge detecting arm 39 laterally inwardly toward each other to the position shown on FIG. 2. It will be appreciated that coil spring 44, in extending laterally under holder 11 approximately midway between springs 19 assists the latter in urging holder 11 upwardly in housing 1.

The battery case according to this invention being described with reference to FIGS. 1–4 is intended to selectively house cylindrical batteries having different diameters characteristic of the different sizes thereof. In order to ensure that each battery, irrespective of its diameter, will be laterally centered in housing 1, that is, will be disposed with the longitudinal axis of the battery midway between side walls 13a and 13b, the central portion of holder 11 is substantially V-shaped in cross-section so as to present surface portions 45 extending therealong at opposite sides of its longitudinal medium and which converge in the direction away from opening 2 of housing 1.

The positive terminal plate 17 on end wall 16 is of sheet metal bent into the shape of a channel projecting vertically between guide rods 15 and of sufficient extent in the direction of the movement of holder 11 to ensure contact with the positive terminal of any size battery intended to be accommodated in housing 1. A negative terminal plate 47 is provided adjacent the end of housing 1 remote from end wall 16. The negative terminal plate 47 is formed of a bent metal strip having parallel end pieces 47a and 47b extending at right angles from the opposite ends of a cross-piece 47c. The top of housing 1 is cut out or stepped down, as at 48, along the end portion of the housing 1 remote from end wall 16, so as to there provide a gap between the top of housing 1 and the undersurface of cabinet wall 3 in which negative terminal plate 47 can move slidably in the longitudinal direction of housing 1. More particularly, tracks 49 are molded along the opposite sides of housing 1 at cutout 48, and the lower edges of end pieces 47a and 47b of terminal plate 47 are slidable in such tracks 49. Further, the upper edge portions of end pieces 47a and 47b are bent over to define shoes 50 which are slidable against the underside of cabinet wall 3 so as to maintain engagement of end pieces 47a and 47b in tracks 49. The cross piece 47c may also have a relatively wide central portion 51 to define a raised edge portion 52 which may be laterally guided between protrusions (not shown) extending along the underside of cabinet wall 3 parallel to the direction of desired movement of terminal plate 47. Spring anchors 53 are struck from end pieces 47a and 47b, and tension springs 55 are connected between such spring anchors 53 on terminal plate 47 and spring anchors 54 extending outwardly from side walls 13a and 13b of housing 1 adjacent openings 41 for yieldably urging negative terminal plate 47 to a position in which its cross piece 47c abuts against end edges 48a of cutout 48. A substantially hemispherical negative contact 56 is provided at the inner surface of the central portion 51 of terminal plate 47.

The battery case of FIGS. 1–4 is intended to selectively house two batteries at a time of three different sizes, for example, batteries of the sizes conventionally identified by the designations R20, R14 and R6. The housing 1 is dimensioned to accommodate two of the largest batteries, that is, the size R20 batteries, arranged in axial alignment or in series. By way of example, it is noted that size R20 battery is standardized to have a diameter of 32.0 to 34.0 mm and a length of 59.0 to 61.5 mm, a size R14 battery is standardized to have a diameter of 24.0 to 26.0 mm and a length of 48.0 to 50.0 mm, and a size R6 battery is standardized to have a diameter of 13.5 to 14.5 mm and a length of 49.0 to 50.0 mm. Therefore, it will be apparent that dimensioning housing 1 to be large enough to accommodate two of the size R20 batteries in axial alignment or series will ensure that such housing will alternatively readily accommodate two of the size R14 batteries, or two of the size R6 batteries in place of the R20 batteries.

The above described battery case according to this invention operates as follows:

Starting with no battery contained in housing 1, it will be appreciated that coil springs 19 and 44 act upwardly on battery holder 11 for urging the latter to its uppermost position in housing 1 where projections 12 of holder 11 engage against the upper ends of slits 14. Further, coil spring 44 causes pivotal members 23a and 23b to assume their innermost positions in which the free ends of arms 25 on member 23a engage against the free ends of the corresponding arms 25 on member 23b while the contacting end portions 40 of detecting arms 39 extend through notches 42 of battery holder 11 to protrude above the upper surface of the latter.

Figure 2:
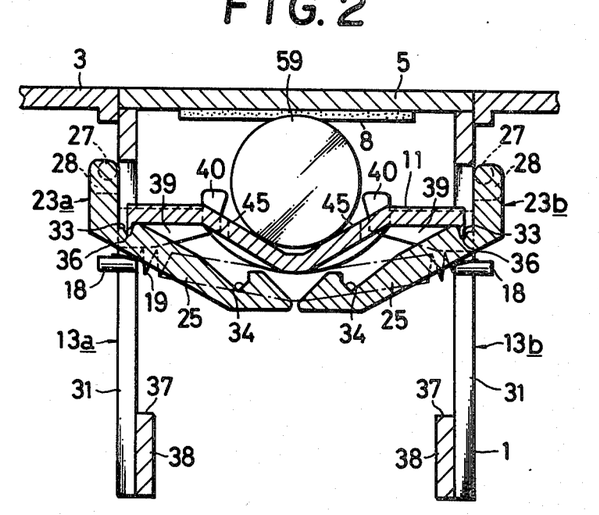
FIG. 2 is an enlarged vertical sectional view taken along the line X—X on FIG. 1, but with the battery case shown in its assembled condition and as the same appears when housing the smallest of the batteries for which it is intended.
Figure 3:
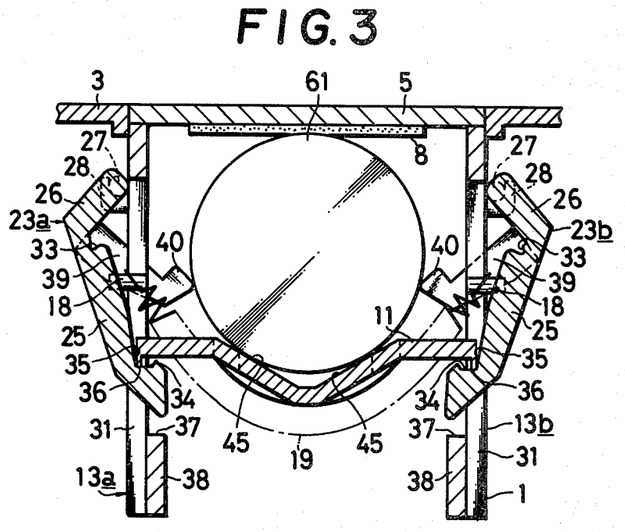
FIGS. 3 and 4 are vertical sectional views similar to that of FIG. 2, but showing the assembled battery case as the same appears when housing a battery of intermediate size and a battery of the largest size, respectively, for which the battery casing is intended.

When two size R6 batteries 59 are inserted one after the other through opening 4 of cabinet wall 3 and opening 2 of housing 1 so as to lie in axial alignment on the V-shaped central portion of holder 11 and be centered by the converging surface portion 45 thereof, as shown on FIG. 2, such size R6 batteries 59 have a diameter smaller than the minimum distance between contacting end portions 40 of detecting arms 39 and, accordingly, do not displace such detecting arms. Therefore, when lid 5 is installed in its closed position, resilient pressure pad 8 at the underside thereof is compressed against batteries 59 and holder 11 is moved slightly downward from its uppermost position to engage its locking ridges 36 in locking recesses 33 of arms 25. Such engagement of ridges 36 in recesses 33 serves to securely lock holder 11 in the position shown on FIG. 2 for snugly retaining the batteries between holder 11 and pressure pad 8 on lid 5. As the two batteries 59 are inserted one after the other through hole 4 negative terminal plate 47 is progressively displaced in the longitudinal direction of housing 1 from its initial position against cutout edges 48a. When the two batteries are finally disposed in axial alignment on holder 11 between terminal plates 17 and 47, springs 55 acting on negative terminal plate 47 ensure that the positive terminal plate 17 and the negative terminal plate 47 will be held in secure engagement with the adjacent respective terminals of the batteries.

In the event that size R14 batteries are to be contained in the battery case, the mere insertion of such batteries 61 one after the other, through openings 2 and 4 into housing 1 causes the cylindrical surfaces of each battery to act against contacting end portions 40 of detecting arms 39 and to pivot the latter downwardly and outwardly about the respective pivot pins 27, as shown on FIG. 3. By reason of the previously described angular relationship of the locking arms 25 of each of the pivotal members 23a and 23b relative to the respective detecting arm 39, the locking arms 25 are moved downwardly and outwardly ahead of the respective detecting arm 39 as the latter are acted upon by an inserted battery 61. Thus, the locking ridges 36 of holder 11 are released from locking recesses 33 and, as battery holder 11 is moved downwardly by battery 61, the locking ridges 36 come into engagement with locking recesses 34 adjacent the ends of arms 25. Thus, when a size R14 battery 61 is inserted in housing 1, battery holder 11 is automatically locked in its intermediate position shown on FIG. 3. In such position of holder 11, a proper space is defined for housing two batteries 61 in series between the securely held battery holder 11 and the resilient pressure pad 8 of lid 5. in this case also, the converging surface portions 45 of battery holder 11 securely center the size R14 batteries 61, while the slidable mounting of terminal plate 47 and springs 55 acting thereon ensure that the terminal plates 17 and 47 will effect secure contact with the respective terminals of the batteries 61.

Figure 4:
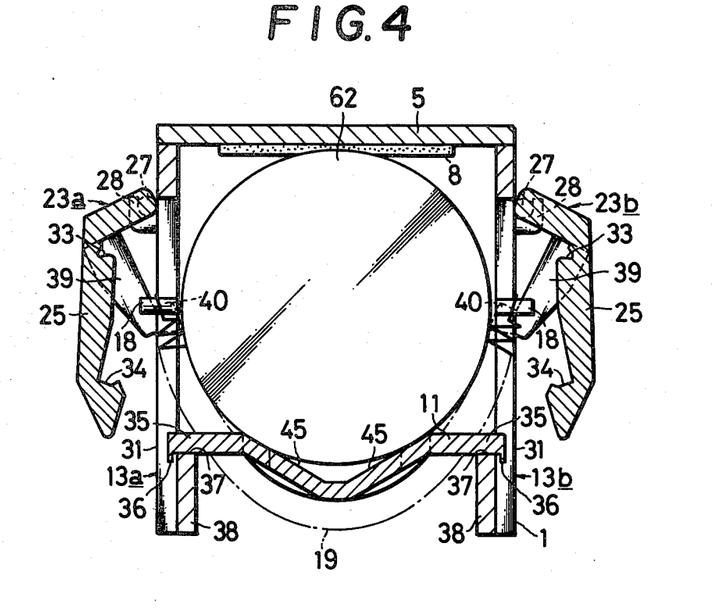

When the largest batteries, that is, size R20 batteries 62, are inserted in the battery case embodying this invention, each such battery 62 urges detecting arms 39 still further apart so that locking arms 25 are completely withdrawn out of housing 1, as shown on FIG. 4. Thus, locking ridges 36 on battery holder 11 cannot engage in locking recesses 34 of arms 25 as holder 11 is displaced downwardly by each battery 62. Accordingly, each inserted battery 62 can displace holder 11 to its lowermost position in which lateral extensions 35 thereof engage solidly against seats or edges 37 at the bottom of openings 31. When lid 5 is installed in its closed position, the size R20 batteries 62 are securely held between pressure pad 8 and holder 11 engaging seats 37. Once again, the downwardly converging surface portions 45 of holder 11 serve to laterally center batteries 62 within housing 1, while springs 55 acting on negative terminal plate 47 ensure that two size R20 batteries arranged in series between terminal plates 17 and 47 will be held in secure electrical contact with each other and with the respective terminal plates.

When the batteries 59, 61 or 62 are removed from housing 1, springs 19 and 44 acting on holder 11 and pivotal members 23a and 23b will restor the same to their initial positions in which projections 12 on holder 11 engage the upper ends of slits 14 and the free ends of locking arms 25 of pivotal member 23a engage the free ends of the respective arms 25 on pivotal member 23b.

In the above description of the embodiment of this invention illustrated in FIGS. 1-4, reference has been made to the selective housing in the battery case of size R20, R14 and R6 batteries. However, it will be appreciated, that the various parts of such battery case may be easily dimensioned to selectively house other size batteries, for example, size R14, R6 and R03 batteries, or different combinations of such batteries. Further, although the previously described embodiment is capable of selectively housing three different sizes of batteries, a battery case according to this invention may, if desired, be provided to selectively house only two different sizes of batteries.

Figure 5:
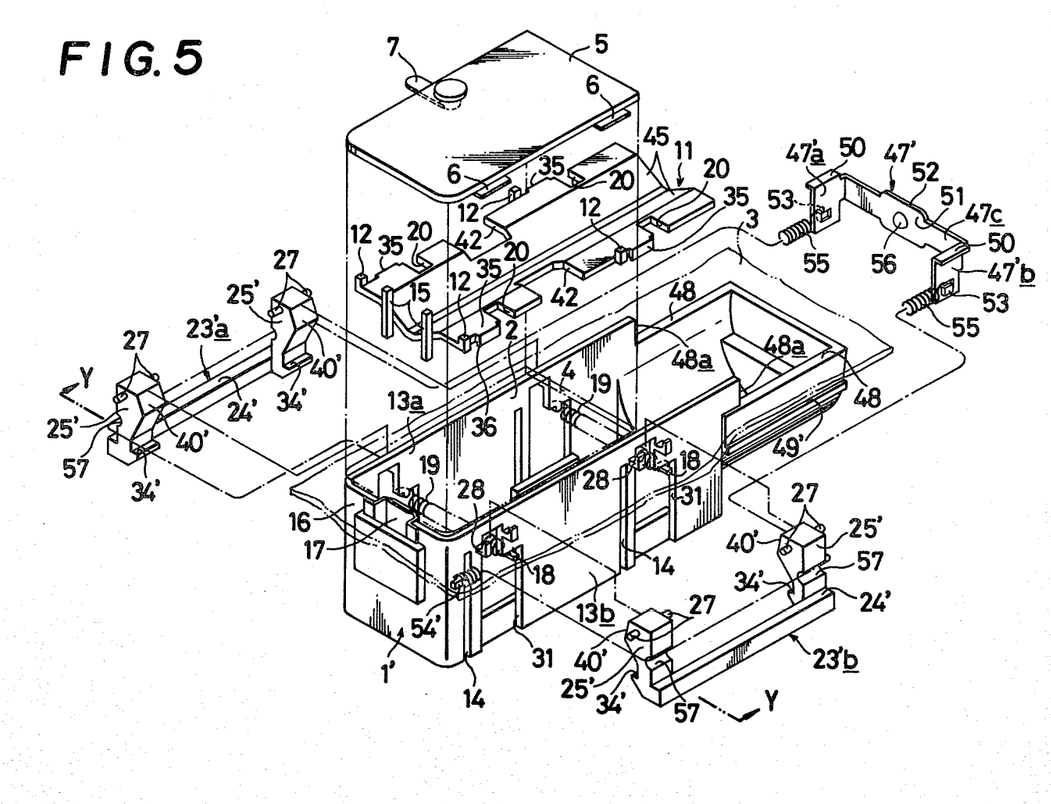
FIG. 5 is a view similar to that of FIG. 1, but illustrating a battery case according to another embodiment of the present invention.
Figure 6:
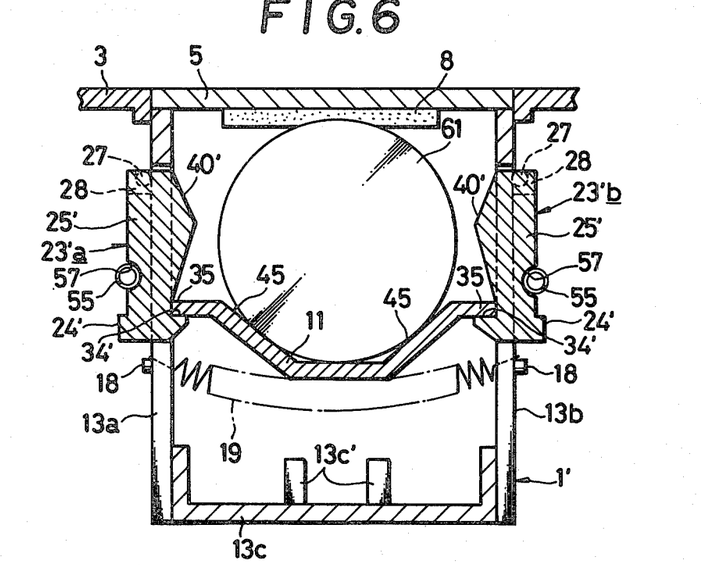
FIG. 6 is an enlarged vertical sectional view taken along the line Y—Y on FIG. 5, but showing the respective battery case in its assembled condition and as the same appears when containing or housing the smallest battery for which it is intended.
Figure 7:
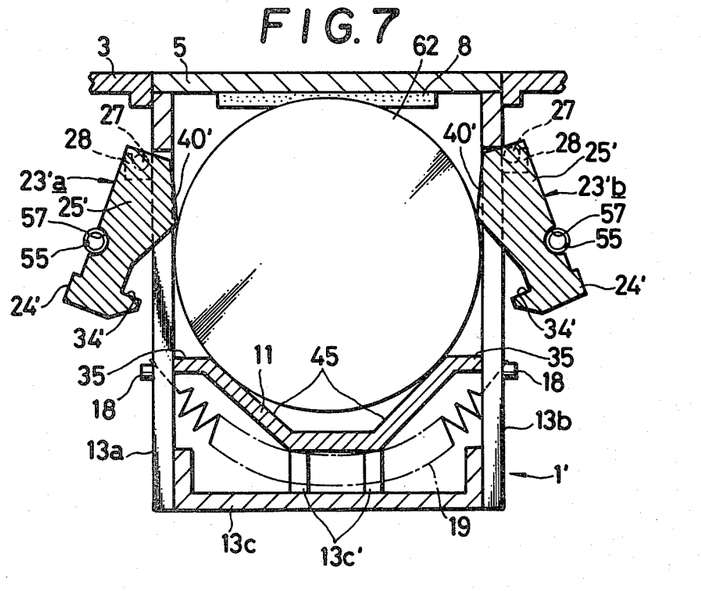
FIG. 7 is a view similar to that of FIG. 6, but showing the battery case housing the largest battery for which it is intended.

For example, as shown in FIGS. 5-7, in which parts corresponding to those described above with reference to FIGS. 1-4 are identified by the same reference numerals and will not be further described in detail, a battery case according to a second embodiment of the invention may include pivotal elements 23'a and 23'b, each of which includes an elongated connecting element 24' extending between and connecting a pair of locking arms 25'. Each of the arms 25' is formed, at one end, with pivot pins 27 projecting therefrom for engagement in the pivot pin supports or seats 28 extending from the outer surfaces of the respective side wall 13a or 13b. The connecting element 24' of each of the pivotal members 23'a and 23'b, is joined to the ends of the respective arms 25' remote from pivot pins 27 and at the outer surfaces of arms 25', that is, at the sides of the respective arms 25' facing away from the adjacent side wall 13a or 13b. Thus, arms 25' can move through respective openings 31 in walls 13a and 13b between inner positions (FIG. 6) and outer positions (FIG. 7). Each of arms 25' is formed with a single locking recess 34' adjacent the lower end thereof, that is, the end remote from pivot pins 27 so that, when arms 25' are in their inner positions (FIG. 6), lateral extensions 35 of battery holder 11 are engageable in locking recesses 34' for locking holder 11 in its first position, whereas, when arms 25' are displaced angularly to their outer positions, holder 11 is free to be displaced downwardly to its second position (FIG. 7) in which holder 11 engages securely against stops or projections 13c' extending upwardly from the bottom wall 13c of housing 1'.

Further, in the battery case according to the embodiment of this invention illustrated on FIGS. 5-7, the tracks 49' for negative terminal plate 47' are displaced downwarldy from the cutout 48 of housing 1' and slidably receive the lower edges of the end pieces 47'a and 47'a which are suitably enlarged in the vertical direction. Thus, the anchors 53 for springs 55 can be relatively lower on FIG. 5 than on FIG. 1, and the anchors 54' for such springs on housing 1' of FIG. 5 are disposed adjacent end wall 16 and at a level corresponding to that of the respective anchors 53 on terminal plate 47'. By reason of the foregoing, springs 55 extend across the outer sides of arms 25' and are received in seats or grooves 57 formed in the outer surfaces of arms 25' to perform the dual functions of urging negative terminal plate 47' to its initial position against edges 48a of cutout 48 and urging arms 25' to their inner positions (FIG. 6) which are limited by engagement of the respective connecting element 24' against the outer surface of the adjacent side wall 13a or 13b between openings 31.

In the embodiment of the invention shown on FIGS. 5-7, the battery size detecting means is formed directly on arms 25' which, for that purpose, have inwardly directed contacting portions 40' dimensioned to protrude through the respective openings 31 into the interior of housing 1' when arms 25' are in their inner positions (FIG. 6).

The battery case according to the embodiment of the invention described above with reference to FIGS. 5-7 may be dimensioned to selectively house two batteries at a time of two different sizes, for example, batteries of the sizes identified by the designations R14 and R20, and, in that case, the battery case of FIGS. 5–7 operates as follows:

When size R14 batteries 61 are inserted in housing 1', the diameter of each such battery 61 is smaller than the lateral distance between contacting portions 40' of arms 25' with the latter in their inner positions, so that lateral projections 35 of holder 11 engage in locking recesses 34' for locking holder 11 in its first or raised position shown on FIG. 6. In such first or raised position of holder 11, the size R14 batteries 61 are laterally centered by the converging surface portions 45 on holder 11, and the batteries are securely held between the pressure pad 8 on closed lid 5 and the locked holder 11.

When size R20 batteries 62 are inserted into housing 1', as shown on FIG. 7, such batteries act against contacting portions 40' on arms 25' for moving the latter to their outer positions in which the lateral extensions 35 of holder 11 cannot engage in locking recesses 34' as holder 11 is displaced downwardly by each battery 62. Accordingly, each inserted battery 62 can displace holder 11 to its lowermost position against stops 13c' so that the size R20 batteries 62 are securely held between pressure pad 8 on closed lid 5 and the securely locked holder 11. Once again, the downwardly converging surface portions 45 of holder 11 serve to laterally center battery 62 within housing 1.

Whether the size R14 batteries 61 or the size R20 batteries 62 are inserted in housing 1', springs 55 acting on negative terminal plate 47' ensure that the batteries arranged in series between terminal plates 17 and 47' are held in secure electrical contact with each other and with the respective terminal plates. Furthermore, when the batteries 61 or 62 are removed from housing 1', springs 19 acting on holder 11 will return the latter upwardly to its first or uppermost position shown on FIG. 6, and springs 55 will return arms 25' of pivotal members 23'a and 23'b to their inner positions in which the lateral projections 35 of raised holder 11 are received in locking recesses 34'.

It will be seen that, in each of the above-described embodiments of the invention, the overall dimensions of the housing 1 or 1' are dictated only by the size of the largest of the batteries to be selectively housed therein, so that the overall space required for the battery case can be minimized for correspondingly reducing the necessary size of a battery powered electronic apparatus incorporating the battery case. Further, the batteries 59, 61 or 62 selectively housed in the battery case according to either of the described embodiments of this invention are securely positioned between the locked battery holder 11 and the closed lid 5 so that there is no danger that the housed batteries may shift or move to interrupt their contact with the terminal plates 17 and 47 or 47', even if the electronic apparatus is subjected to rough usage or handling. Finally, it will be appreciated that, in each of the disclosed embodiments, the changing of the position of the battery holder 11 within the housing 1 or 1' is effected automatically merely in response to the insertion of the batteries 59, 61 or 62. Similarly, the position of the negative terminal plate 47 or 47' is determined automatically merely in response to the insertion of the selected batteries, so that the accommodation of the space within the battery case to the batteries of the selected size is achieved easily, and without the possibility of error.

In both of the above-described embodiments of the invention, the holder 11 is shown to be vertically movable or adjustable in housing 1 or 1'. However, it will be appreciated that, in a battery case according to this invention, the holder 11 thereof may be moved or adjusted in other directions, for example, in the transverse direction, in response to the insertion of batteries of different sizes. Further, it will be appreciated that a battery case according to this invention may be desirably incorporated in various kinds of electronic apparatus, such as radio or television receivers, audio type recorders, VTRs and the like.

Although illustrative embodiments of the invention have been described in detail herein with reference to the accompanying drawings, it is to be understood that the invention is not limited to such precise embodiments, and that various changes and modifications my be effected therein by one skilled in the art without departing from the scope or spirit of the invention as defined in the appended claims.

What is claimed is:

1. A battery case for selectively housing batteries of different sizes, comprising:
    a housing dimensioned to receive the largest of said batteries and having an opening through which the batteries are insertable into said housing;
    a lid engageable in said opening for closing said housing;
    a battery holder disposed in said housing for movement in the direction toward and away from said opening between at least first and second positions to effectively vary the space available in said housing between said holder and said lid for accommodating the batteries therein;
    locking means selectively engageable with said holder so as to limit said movement of the latter in at least said first and second positions thereof relative to said housing; and
    battery size detecting means projecting into said housing and engageable by a battery inserted therein through said opening for movement by the inserted battery thereby to move said locking means for determining which of said locking means engages said holder so that the resulting position of said holder corresponds to the size of the inserted battery.

2. A battery case according to claim 1; in which said locking means includes stop means on said housing engageable by said holder when the largest of said batteries is inserted to prevent movement of said holder away from said opening beyond said second position.

3. A battery case for selectively housing batteries of different sizes, comprising:
    a housing dimensioned to receive the largest of said batteries and having an opening through which the batteries are insertable into said housing;
    a lid engageable in said opening for closing said housing;
    a battery holder disposed in said housing for movement in the direction toward and away from said opening between at least first and second positions to effectively vary the space available in said housing between said holder and said lid for accommodating the batteries therein;
    locking means selectively engageable with said holder so as to limit said movement of the latter in at least said first and second positions thereof relative to said housing, wherein said locking means includes stop means on said housing engageable by said holder when the largest of said batteries is inserted to prevent movement of said holder away from said opening beyond said second position and said locking means further includes locking arms mounted on said housing for movement between at least first positions, in which said locking arms engage said holder to position the latter in said first position of the holder, and second positions of said locking arms, in which the latter release said holder to permit the holder to be moved to its second position against said stop means by said largest battery; and battery size detecting means projecting into said housing and engageable by a battery inserted therein through said opening for moving said locking arms and determining which of said locking means engages said holder so that the resulting position of said holder corresponds to the size of the inserted battery.

4. A battery case according to claim 3; in which said detecting means are integral with said locking arms, and said integral locking arms and detecting means are pivoted in respect to said housing.

5. A battery case according to claim 3; in which said detecting means includes detecting arms mounted on said housing for movement into the latter from opposite sides thereof, and spring means acting on said detecting arms to urge the latter toward each other to first positions corresponding to said first positions of said locking arms and in which the smallest of said batteries is disposable between said detecting arms without displacing the latter from said first positions thereof; and in which said largest battery, when disposed in said housing, displaces said detecting arms away from each other to second positions thereof which correspond to said second positions of said locking arms.

6. A battery case according to claim 5; in which said detecting arms are integral with said locking arms, and said integral locking arms and detecting arms are pivoted in respect to said housing.

7. A battery case according to claim 5; in which a battery of intermediate size between that of said largest and smallest batteries, when disposed in said housing, displaces said detecting arms away from each other to intermediate positions between said first and second positions of the detecting arms, and said intermediate positions of the detecting arms correspond to respective intermediate positions of said locking arms; and in which said locking arms, when in said intermediate positions, engage said holder to lock the latter in an intermediate position between said first and second positions of the holder.

8. A battery case according to claim 7; further comprising spring means yieldably urging said holder toward said first position thereof.

9. A battery case according to claim 8; in which said detecting and locking arms are integral with each other and are mounted for pivoting relative to said housing about axes adjacent the opposite sides of said opening, said locking arms are angled relative to the respective detecting arms in directions away from said opening, and said locking arms having locking seats relatively near to the respective pivoting axes and remote from said axes and which are engaged by said holder in said first and intermediate positions, respectively, of said locking arms.

10. A battery case according to claim 1; further comprising a resilient pressure pad on the underside of said lid for snugly holding a selected battery in said housing between said pad on the lid and said holder in the respective one of said positions thereof.

11. A battery case for selectively housing cylindrical batteries having different diameters characteristic of different sizes thereof, comprising:

an elongated housing dimensioned to receive the largest of said batteries with the axis of the latter extending longitudinally in the housing and having an opening through which the batteries are insertable into said housing;

a lid engageable in said opening for closing said housing;

a battery holder disposed in said housing for movement in the direction toward and away from said opening between at least first and second positions to effectively vary the space available in said housing between said holder and said lid for accommodating the batteries therein;

locking means selectively engageable with said holder so as to limit said movement of the latter in at least said first and second positions thereof relative to said housing; and battery size detecting means projecting into said housing at the opposite sides of the latter and engageable by a battery inserted therein through said opening for detecting the diameter of an inserted battery and thereby determining which of said locking means engages said holder so that the resulting position of said holder corresponds to the size of the inserted battery.

12. A battery case according to claim 11; in which said holder has surface portions extending therealong at opposite sides of its longitudinal median and which converge in the direction away from said opening for laterally centering each of the batteries.

13. A battery case according to claim 11, further comprising terminal elements adjacent the opposite ends of said elongated housing, at least one of said terminal elements being mounted for movement in respect to said housing in the longitudinal direction of the latter, and spring means for urging said one terminal element toward the other of said terminal elements.

14. A battery case according to claim 13; in which said locking means includes locking arms mounted at opposite sides of said housing for movement in respect to the latter between first and second positions which correspond to said first and second positions of the holder, said detecting means are integral with said locking arms and are movable therewith, and said spring means also act on said locking arms for urging the latter to said first positions thereof.

* * * * *